United States Patent
Murai et al.

(10) Patent No.: US 11,702,556 B2
(45) Date of Patent: Jul. 18, 2023

(54) AQUEOUS INK, INK CARTRIDGE AND INK JET RECORDING METHOD

(71) Applicant: CANON KABUSHIKI KAISHA, Tokyo (JP)

(72) Inventors: Yasuaki Murai, Tokyo (JP); Kuniaki Fujimoto, Fukushima (JP); Saki Tasaki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 318 days.

(21) Appl. No.: 17/092,417

(22) Filed: Nov. 9, 2020

(65) Prior Publication Data

US 2021/0139724 A1 May 13, 2021

(30) Foreign Application Priority Data

Nov. 12, 2019 (JP) ................................ 2019-204529
Oct. 5, 2020 (JP) ................................ 2020-168317

(51) Int. Cl.
  *C09D 11/328* (2014.01)
  *C09D 11/037* (2014.01)
  (Continued)

(52) U.S. Cl.
  CPC ......... *C09D 11/328* (2013.01); *B41J 2/17503* (2013.01); *B41M 5/0023* (2013.01); *C09B 67/0059* (2013.01); *C09D 11/037* (2013.01)

(58) Field of Classification Search
  CPC .. C09D 11/328; C09D 11/037; B41J 2/17503; B41J 2/1752; B41J 2/1753;
  (Continued)

(56) References Cited

U.S. PATENT DOCUMENTS 7,083,667 B2   8/2006   Murai et al.
7,285,159 B2  10/2007   Aikawa et al.
              (Continued)

FOREIGN PATENT DOCUMENTS

CN    104478743 A   *  4/2015
JP    2003064275 A  *  3/2003   .............. B41M 5/52
              (Continued)

OTHER PUBLICATIONS

English Machine Translation of CN104478743A ("Machine Translation_Zhu_CN_104478743_A") (Year: 2015).*
(Continued)

*Primary Examiner* — Bryan D. Ripa
*Assistant Examiner* — Jeffrey Eugene Barzach
(74) *Attorney, Agent, or Firm* — Venable LLP (57) ABSTRACT

Provided is an aqueous ink that excels in a hue as a yellow ink, and capable of recording an image that excels both in color developability and light fastness. The aqueous ink is an ink for inkjet, containing a first coloring material and a second coloring material. The first coloring material is a compound represented by general formula (1), and the second coloring material is a compound represented by general formula (2).

(Continued)

-continued

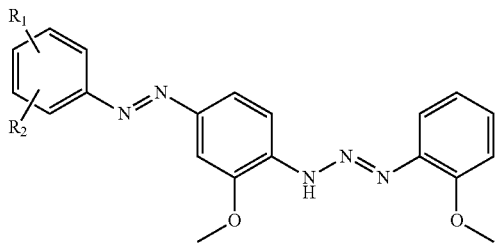

(2)

15 Claims, 2 Drawing Sheets (51) Int. Cl.
*B41M 5/00* (2006.01)
*B41J 2/175* (2006.01)
*C09B 67/22* (2006.01)

(58) Field of Classification Search
CPC ............. B41J 2/17553; B41J 2/17513; B41M 5/0023; C09B 67/0059; C09B 67/0055
See application file for complete search history.

(56) References Cited

U.S. PATENT DOCUMENTS

| | | | |
|---|---|---|---|
| 7,294,184 | B2 | 11/2007 | Fujimoto et al. |
| 7,303,615 | B2 | 12/2007 | Yamagishi et al. |
| 7,445,325 | B2 | 11/2008 | Aikawa et al. |
| 7,504,488 | B2 | 3/2009 | Toyoda et al. |
| 7,566,362 | B2 | 7/2009 | Mori et al. |
| 7,598,012 | B2 | 10/2009 | Murai et al. |
| 7,618,484 | B2 | 11/2009 | Fujimoto et al. |
| 8,343,269 | B2 | 1/2013 | Takahashi et al. |
| 8,814,341 | B2 | 8/2014 | Nagao et al. |
| 9,988,541 | B2* | 6/2018 | Shimomura ......... C09D 11/322 |
| 10,259,960 | B2 | 4/2019 | Fujimoto et al. |
| 10,280,323 | B2 | 5/2019 | Fujimoto et al. |
| 2005/0093950 | A1* | 5/2005 | McCain ................ C09D 11/32 347/100 |
| 2007/0188573 | A1* | 8/2007 | Hamajima ............ C09D 11/40 347/100 |
| 2016/0122546 | A1* | 5/2016 | Abel .................. C09B 29/0003 534/554 |

FOREIGN PATENT DOCUMENTS

JP 2004-083903 A 3/2004
JP 2007-063520 A 3/2007

OTHER PUBLICATIONS

English Machine Translation of JP2003064275A ("Machine_Translation_Hanaki_JP_2003064275_A") (Year: 2003).*

* cited by examiner

AQUEOUS INK, INK CARTRIDGE AND INK JET RECORDING METHOD

BACKGROUND OF THE INVENTION

Field of the Invention

The present invention relates to an aqueous ink, an ink cartridge and an ink jet recording method.

Description of the Related Art

In the field of ink jet recording method in recent years, image to be recorded has come to have unprecedently high quality, as a result of minimization of ink droplet, and expansion of color gamut owing to introduction of multicolor ink. This has however raised required levels of a coloring material or an ink, imposing more strict requirements on spectral characteristics including color developability and hue, or on reliability of an ink such as light fastness. In this situation, Japanese Patent Application Laid-Open No. 2004-83903 and Japanese Patent Application Laid-Open No. 2007-63520 propose inks that contain predetermined compounds (dyes) as the coloring material, aimed at improving various characteristics of the inks.

SUMMARY OF THE INVENTION

As a result of an investigation conducted by the present inventors, it has been found that dyes used for the ink for ink jet has succeeded in satisfying both of spectral reflection characteristics (hue) and light resistance at high levels.

It is therefore an object of the present invention to provide an aqueous ink that excels in hue as a yellow ink, and capable of recording an image that excels both in color developability and light fastness. It is another object of the present invention to provide an ink cartridge and an ink jet recording method that use such aqueous ink.

The aforementioned object is attainable by the present invention summarized below. That is, according to the present invention, there is provided an aqueous ink for ink jet including a first coloring material and a second coloring material, the first coloring material is a compound represented by general formula (1), and the second coloring material is a compound represented by general formula (2).

(In general formula (2), $R_1$ and $R_2$ each independently represent a hydrogen atom, —COOM or —$SO_3M$, and M's each independently represent a hydrogen atom, alkali metal, ammonium or organic ammonium.)

According to the present invention, provided is an aqueous ink that excels in hue as a yellow ink, and capable of recording an image that excels both in color developability and light fastness. The present invention can also successfully provide an ink cartridge and an ink jet recording method that use such aqueous ink.

Further features of the present invention will become apparent from the following description of exemplary embodiments with reference to the attached drawings.

DESCRIPTION OF THE EMBODIMENTS

The present invention will be described in more detail below with reference to preferred exemplary embodiments. In the present invention, in a case where a compound is a (In general formula (1), M's each independently represent a hydrogen atom, alkali metal, ammonium or organic ammonium)

salt, the salt is present in an ink in a state of being dissociated into ions. However, this is referred to as "containing a salt" for the sake of convenience. In addition, aqueous ink for ink jet may be simply referred to as "ink". The physical property values are values at normal temperature (25° C.) unless otherwise specified.

The present inventors found from investigations that combined use of a first coloring material and a second coloring material described later, can yield an ink which demonstrates good spectral reflection characteristics in the yellow region, and can record lightfast images, the finding led us to the present invention. The first coloring material (compound represented by general formula (1)) excels in light fastness but has a reddish hue. Meanwhile, the second coloring material (compound represented by general formula (2)) excels in color developability for its large coloring power, but has a greenish hue. In addition, since the first coloring material and the second coloring material are structurally similar to each other, so that combined use of them will supposedly allow both coloring materials to exhibit their good performances without being degraded, and to successfully attain the aforementioned effects.

<Ink>

The aqueous ink of the present invention contains the first coloring material and the second coloring material. The first coloring material is a compound represented by general formula (1). The second coloring material is a compound represented by general formula (2). The ink of the present invention is not necessarily curable by active energy ray, and does not necessarily have any monomer having a polymerizable group. Compositions constituting the ink of the present invention and physical properties of ink will be detailed below.

(Coloring Material)

The ink of the present invention contains the compound represented by general formula (1) as the first coloring material, and the compound represented by general formula (2) as the second coloring material. These coloring materials are water-soluble dyes. For color toning, a dye having a structure different from those of the first coloring material and the second coloring material may be used in a combined manner.

In general formula (2), $R_1$ and $R_2$ each independently represent a hydrogen atom, —COOM or —$SO_3M$, and M's each independently represent a hydrogen atom, alkali metal, ammonium or organic ammonium.

The alkali metal represented by M in the compound represented by general formula (1) and in the compound represented by general formula (2) is exemplified by lithium, sodium and potassium. Similarly, the organic ammonium represented by M is exemplified by alkylammoniums such as methylammonium, dimethylammonium, trimethylammonium, tetramethyammonium, ethylammonium, n-propylammonium and n-butylammonium; and mono-, di- or tri-alkanolammoniums such as monoethanolammonium, diethanolammonium and triethanolammonium. From the viewpoint of enhancement of water solubility, M preferably represents lithium, sodium potassium or ammonium.

The compound represented by general formula (1) (first coloring material) is C.I. Direct Yellow 132. From the viewpoints of high water solubility and high availability, more preferred is C.I. Direct Yellow 132 having sodium for M in general formula (1).

The compound represented by general formula (2) (second coloring material) is preferably such that either one of $R_1$ or $R_2$ in general formula (2) represents a hydrogen atom, and the other one of them represents —$SO_3M$. Among the compounds represented by general formula (2) (second coloring material), more preferred is a compound repre In general formula (1), M's each independently represent a hydrogen atom, alkali metal, ammonium or organic ammonium.

sented by general formula (2.1), for its excellent water solubility, and an attainability of image which further excels in light fastness.

(2.1)

In general formula (2.1), M represents a hydrogen atom, alkali metal, ammonium or organic ammonium. M in general formula (2.1), as well as preferred examples thereof, are synonymous to M in general formula (2).

Preferred examples of the compounds represented by general formula (2), which is the second coloring material, include compounds II-1 to II-5 respectively represented by chemical formulae (II-1) to (II-5) given in the form of free acid. Of course in the present invention, the compound represented by general formula (2) is not limited to the compounds shown below, so long as it is encompassed by the structure of general formula (2) and the definitions thereof. Among the compounds in the free acid form shown below, most preferred in the present invention is compound II-1 that belongs to the compound represented by general formula (2.1) above.

Compound II-1

(II-1)

Compound II-2

(II-2)

Compound II-3

(II-3)

Compound II-4

(II-4)

Compound II-5

(II-5)

The compound represented by general formula (2), which is the second coloring material, may be synthesized for example by the method explained below. Note that $R_3$ and $R_4$ in general formulae (a) and (c), which are referred to in the explanation below regarding the synthetic method, respectively correspond to $R_1$ and $R_2$ in general formula (2), and independently represents a hydrogen atom, —COOH or —SO$_3$H.

A diazo compound obtained by diazotizing a compound represented by general formula (a) according to a usual method is allowed to cause a coupling reaction with a compound (2-methoxyaniline) represented by chemical formula (b) according to a usual method, to thereby obtain a compound (intermediate) represented by general formula (c).

(a) (b)

(c)

(2)

Diazotization of the compound represented by general formula (a) may be allowed to proceed typically by adding a diazotizing agent into a solution of such compound, in the presence of an inorganic acid such as hydrochloric acid or sulfuric acid, at a solution temperature of approximately −50 to 100° C. (preferably −10 to 10° C.). The diazotizing agent employable here includes nitrosylsulfuric acid; and nitrites of alkali metals such as sodium nitrite and potassium nitrite. The coupling reaction of the diazo compound of the compound represented by general formula (a), with the compound represented by chemical formula (b) may be allowed to proceed, for example, in a liquid medium, at a temperature of approximately −50 to 100° C. (preferably −10 to 10° C.), and at a pH value in the acidic to neutral range. The liquid medium employable here includes water, organic solvent and mixtures of them. The pH value is preferably 2 to 7, which may be adjustable by adding base. The base employable here includes, for example, hydroxides of alkali metals such as lithium hydroxide and sodium hydroxide; carbonates of alkali metals such as lithium carbonate, sodium carbonate and potassium carbonate; acetates of alkali metals such as sodium acetate; ammonia; and organic amines. The compound represented by general formula (a) and the compound represented by chemical formula (b) may only be used approximately on the stoichiometric basis.

Next, a diazo compound obtained by diazotizing the compound represented by chemical formula (b) according to a usual method is allowed to cause a coupling reaction with the compound (intermediate) represented by general formula (c), according to a usual method. In this way, obtainable is a free acid form of the compound (second coloring material) represented by general formula (2) (M contained in the formula represents a hydrogen atom).

Diazotization of the compound represented by chemical formula (b) may be allowed to proceed typically by adding the aforementioned diazotizing agent into a solution of such compound, in the presence of an inorganic acid such as hydrochloric acid or sulfuric acid, at a solution temperature of approximately −50 to 100° C. (preferably −10 to 10° C.). The coupling reaction of the diazo compound of the compound represented by chemical formula (b), with the compound (intermediate) represented by general formula (c) may be allowed to proceed, for example, in a liquid medium, at a temperature of approximately −50 to 100° C. (preferably −10 to 10° C.), and at a pH value in the neutral to alkali range. The liquid medium employable here includes water, organic solvent and mixtures of them. The pH value is preferably 7 to 9, which may be adjustable by adding the aforementioned base. The compound represented by chemical formula (b) and the compound represented by general formula (c) may only be used approximately on the stoichiometric basis.

A salt form of the compound represented by general formula (2) (second coloring material) is obtainable by an optional treatment below that follows the synthesis of the free acid form of the compound represented by general formula (2). The treatment is exemplified by salting-out through addition of a desired salt to the reaction system. Another exemplary method is adding a mineral acid such as hydrochloric acid to the reaction system, collecting the compound in the free acid form, washing the obtained compound, keeping the compound in the free acid form in a liquid medium (preferably water), and adding thereto a desired salt to obtain the compound in the salt form.

(Method for Verifying Coloring Material)

Whether the coloring material used in the present invention is contained in the ink or not may be verified by applying methods (1) to (3) below based on high performance liquid chromatography (HPLC).

(1) Retention time of peak
(2) Maximum absorption wavelength at peak in (1)
(3) m/z (positive), m/z (negative) in mass spectrum for peak in (1)

Analytical conditions of high performance liquid chromatography are as follows. An analytical sample is a solution (ink) diluted approximately 1,000 folds with pure water. The sample is then analyzed by high performance liquid chromatography under the conditions below, to find retention time of peak and maximum absorption wavelength of peak.

Column: SunFire Cis (from Waters Japan Corporation), 2.1 mm×150 mm
Column temperature: 40° C.
Flow rate: 0.2 mL/min
PDA: 200 nm to 700 nm
Eluent and gradient conditions: see Table 1

TABLE 1

| Eluent, Gradient Conditions | | | | |
|---|---|---|---|---|
| | 0-5 min | 5-24 min | 24-31 min | 31-45 min |
| A: Water | 85% | 85→45% | 45→0% | 0% |
| B: Methanol | 10% | 10→50% | 50→95% | 95% |
| C: 0.2 mol/L aqueous ammonium acetate solution | 5% | 5% | 5% | 5% |

Analytical conditions of mass spectrum are as follows. A fraction corresponded to the obtained peak was analyzed by mass spectrometry, and species assigned to the most intense m/z peak is further analyzed for both of positive ion and negative ion.

Ionization method: ESI
Capillary voltage: 3.5 kV
Desolvation gas: 300° C.
Ion source temperature: 120° C.
Detector:
for positive ion, 40 V, 200 to 1500 amu/0.9 sec
for negative ion, 40 V 200 to 1500 amu/0.9 sec Results obtained from the measurements according to the aforementioned methods and conditions are listed below.

Sodium salt of compound represented by chemical formula (I) described later ("compound 1-1", described later)
Purity measured by HPLC at 254 nm=98.1%
m/z=319.2 ([M-2Na]$^{2-}$), 639.2 ([M-2Na+H]$^{-}$)
Sodium salt of compound II-1 ("compound 2-1A", described later)

Purity measured by HPLC at 254 nm=97.3% m/z=441.2 ([M-Na]$^-$)

(Content of Coloring Material)

Proportion (% by mass) of a content of the second coloring material to the total content of the first coloring material and the second coloring material in the aqueous ink is preferably 0.20% by mass or more to 2.00% or less. The proportion (% by mass) of the content of the second coloring material may be calculated from an equation: $C_2/(C_1+C_2)\times 100$ (% by mass), where $C_1$ (% by mass) represents content of the first coloring material in the ink, and $C_2$ (% by mass) represents content of the second coloring material. Proportion (% by mass) of the content of the second coloring material is more preferably 0.50% by mass or more to 1.00% or less. More specifically, from the viewpoint of more preferred hue of a yellow ink, the proportion is more preferably 0.50% by mass or more. From the viewpoint of attainability of image which furthermore excels in color developability and light fastness, the proportion is preferably 1.00% by mass or less.

The total content of the first coloring material and the second coloring material in the aqueous ink (aforementioned $C_1+C_2$; % by mass) is preferably 2.500% by mass or more to 6.500% or less based on the total mass of the ink. The total content (% by mass) of these coloring materials is more preferably 3.000% by mass or more to 6.000% or less. More specifically, the total content is preferably 3.000% by mass or more from the viewpoint of attainability of image which further excels in color developability and light fastness when the total content of the coloring material is large to some extent. The total content is also preferably 6.000% by mass or less from the viewpoint of attainability of image which further excels in color developability within a suitable hue range when the total content of the colorant is an appropriate amount.

Content (% by mass) of the first coloring material in the aqueous ink is preferably 0.100% by mass or more to 10.000% or less based on the total mass of the ink, and is more preferably 0.500% by mass or more to 6.500% or less. Content (% by mass) of the second coloring material in the aqueous ink is preferably 0.010% by mass or more to 5.000% or less based on the total mass of the ink, and is more preferably 0.010% by mass or more to 1.000% or less. Proportion of the total content (% by mass) of the first coloring material and the second coloring material, to the total content of all coloring materials in the aqueous ink, is preferably 10.0% by mass or more. The proportion is more preferably 20.0% by mass or more, even more preferably 50.0% by mass or more, and may even be 100.0% by mass.

In the present invention, the image with a preferable hue given by a yellow ink means the two following aspects. That is, it means that an image recorded solely by use of a yellow ink looks neither reddish nor greenish. In addition, it also means that an image, when recorded with secondary colors involving yellow of the ink, so as to be toned with red region color or green region color, can demonstrate a hue which will not largely degrade the hue in the red region and the green region.

More specifically, a solid image is recorded by solely using the yellow ink on a white recording medium, with an amount of adhesion of ink of approximately 0.06 g/inch$^2$, and a* and b* in the L*a*b* color system specified by Commission Internationale de l'Éclairage (CIE) are measured. From the thus obtained values of a* and b*, hue angle)(H° is calculated by using Equations (A) described later, and an image with a hue angle of 85° or more to 92° or less is defined to be a good image having a preferable hue given by the yellow ink. In addition, an ink capable of yielding an image with such hue angle (H°) is defined to be a yellow ink with preferable hue. From the viewpoint of better hue of the yellow ink, the hue angle is (H°) is more preferably 88° or more to 90° or less. Values of a* and b* are determined, for example, by using a spectrophotometer (trade name: Spectrolino, from GretagMacbeth GmbH). The present invention is, of course, not limited thereto. The "white recording medium" employable for the colorimetry is exemplified by any of recording media having an ISO whiteness (JIS P 8148), on the basis of diffuse blue reflectance factor, of approximately 80% or more.

$H°=\tan^{-1}(b*/a*)$, where $a*\geq 0$ and $b*\geq 0$ (first quadrant)

$H°=180+\tan^{-1}(b*/a*)$, where $a*\leq 0$ and $b*\geq 0$ (second quadrant)

$H°=180+\tan^{-1}(b*/a*)$, where $a*\leq 0$ and $b*\leq 0$ (third quadrant)

$H°=360+\tan^{-1}(b*/a*)$, where $a*\geq 0$ and $b*\leq 0$ (fourth quadrant)  Equations (A)

(Aqueous Medium)

The ink of the present invention is an aqueous ink containing at least water as an aqueous medium. The water employed here is preferably deionized water (ion-exchanged water). Content (% by mass) of water based on the total mass of the ink is preferably 10.000% by mass or more to 90.000% or less, and more preferably 50.000% by mass or more to 90.000% or less.

The aqueous medium may further contain a water-soluble organic solvent. The water-soluble organic solvent may only be water-soluble without special limitation, for which monohydric alcohol, polyhydric alcohol, (poly)alkylene glycol, glycol ether, nitrogen-containing polar solvent and sulfur-containing polar solvent are employable. The water-soluble organic solvent employed here preferably has vapor pressure smaller than that of water. Content (% by mass) of the water-soluble organic solvent in the ink is preferably 3.000% by mass or more to 50.000% or less based on the total mass of the ink.

(Other Additives)

Besides the components described previously, the ink of the present invention may optionally contain a water-soluble organic compound that exists as solid at normal temperature, which is exemplified by polyhydric alcohols such as trimethylolpropane and trimethylolethane; and urea derivatives such as urea and ethylene urea. The ink of the present invention may further contain various optional additives such as surfactant, pH adjuster, antiseptic agent, anti-mold agent, antioxidant, anti-reduction agent, evaporation promoter, chelating agent and water-soluble resin. Among them, the ink preferably contains surfactant. Content (% by mass) of the surfactant in the aqueous ink based on the total mass of the ink, is preferably 0.100% by mass or more to 1.500% or less, and more preferably 0.200% by mass or more to 1.200% or less.

<Ink Cartridge>

Figure 1:
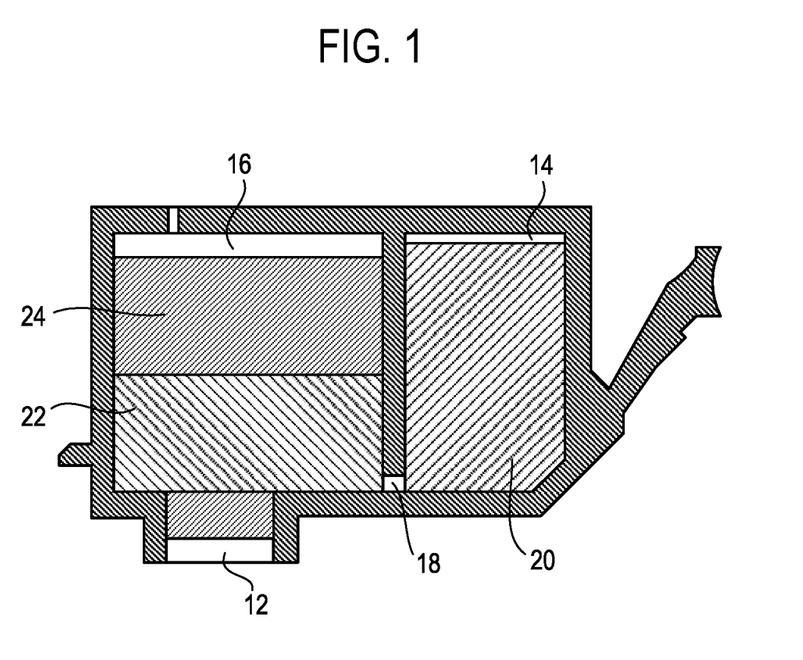
FIG. 1 is a sectional view schematically illustrating an exemplary embodiment of an ink cartridge according to the present invention.

The ink cartridge according to the present invention includes an ink and an ink storage portion that stores the ink. The ink stored in the ink storage portion is the aqueous ink according to the present invention described above. FIG. 1 is a sectional view schematically illustrating an exemplary embodiment of the ink cartridge according to the present invention. As illustrated in FIG. 1, an ink supply port 12 for supplying an ink to a recording head is provided on the bottom surface of the ink cartridge. The inside of the ink cartridge is an ink storage portion that stores the ink. The ink storage portion is made up by an ink storage chamber 14 and an absorber storage chamber 16, and these chambers communicate with each other through a communication port 18. In addition, the absorber storage chamber 16 communicates with the ink supply port 12. A liquid ink 20 is stored in the ink storage chamber 14, and the absorbers 22 and 24 that hold the ink in an impregnated state are stored in the absorber storage chamber 16. The ink storage portion may be configured such that the whole amount of the ink stored is held by the absorber without providing the ink storage chamber that stores a liquid ink. In addition, the ink storage portion may also be configured such that the whole amount of the ink is stored in a liquid state without having the absorber. Further, the ink cartridge may also be configured so as to have an ink storage portion and a recording head.

<Ink Jet Recording Method>

The ink jet recording method according to the present invention is a method of ejecting the above-described aqueous ink according to the present invention from an ink jet recording head to record an image on a recording medium. Systems for ejecting the ink include a system in which mechanical energy is applied to the ink and a system in which thermal energy is applied to the ink. In the present invention, the system in which the thermal energy is applied to the ink to eject the ink is particularly preferably adopted. Steps of the ink jet recording method may be those well known except that the ink according to the present invention is used.

Figure 2A:
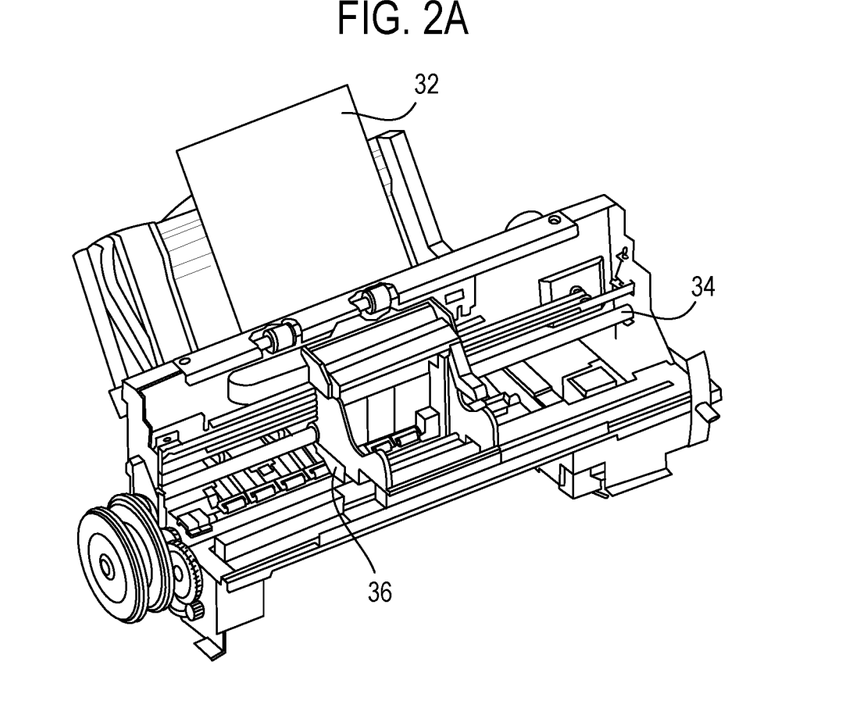
FIG. 2A is a perspective view of an example of a main part of an ink jet recording apparatus used in an ink jet recording method according to the present invention.
Figure 2B:
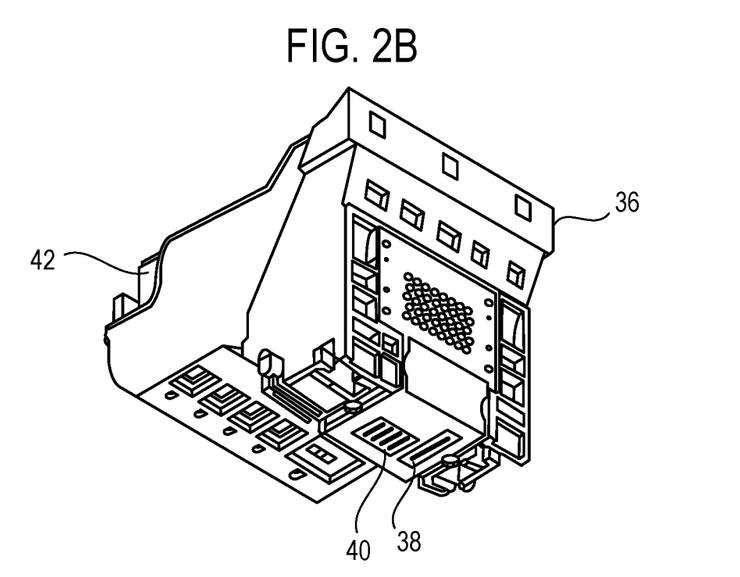
FIG. 2B is a perspective view of an example of a head cartridge of the ink jet recording apparatus used in the ink jet recording method according to the present invention.

FIGS. 2A and 2B are schematic views illustrating an example of an ink jet recording apparatus used in the ink jet recording method according to the present invention. FIG. 2A is a perspective view of a main part of the ink jet recording apparatus and FIG. 2B is a perspective view of a head cartridge. In the ink jet recording apparatus, a conveyance unit (not illustrated) that conveys a recording medium 32 and a carriage shaft 34 are provided. A head cartridge 36 can be mounted on the carriage shaft 34. The head cartridge 36 is provided with recording heads 38 and 40 and is configured such that an ink cartridge 42 is set therein. Inks (not illustrated) are ejected toward the recording medium 32 from the recording heads 38 and 40 while the head cartridge 36 is being carried in a main scanning direction along the carriage shaft 34. Then, the recording medium 32 is conveyed in a sub scanning direction by the conveyance unit (not illustrated) and an image is recorded on the recording medium 32. The recording medium 32 is not particularly limited and it is preferable to use a recording medium using paper, such as a recording medium having no coat layer such as plain paper and a recording medium having a coat layer such as glossy paper or matte paper, as a base material.

EXAMPLES

The present invention will further be detailed below, referring to Examples and Comparative Examples. The present invention is, however, by no means limited to these Examples, without departing from the spirit thereof. All amounts of components given in "part(s)" or "%" are on the mass basis unless otherwise specifically noted.

<Syntheses of Coloring Materials>

(Synthesis of Compound 1-1)

Into 30.0 parts of water, 10.0 parts of a compound represented by chemical formula (a1) was allowed to disperse. To the dispersion, 17.0 part of concentrated hydrochloric acid was added to prepare a solution, and the solution was then cooled in an ice bath. To the solution, a solution prepared by dissolving 4.2 parts of sodium nitrite in 10.0 parts of water was added dropwise at a solution temperature of 0 to 5° C., and the mixture was stiffed for 30 minutes at this temperature. Next, 0.8 parts of amidosulfuric acid was added to obtain a diazotizing solution.

(a1)

A solution was prepared by dissolving 6.8 parts of 2-methoxyaniline (see chemical formula (b) above) in 25.0 part of methanol. The solution was then added dropwise to the diazotizing solution, while keeping the temperature unchanged. Upon completion of dropwise addition, pH was adjusted to 3.0 to 3.5 by using saturated sodium acetate solution, and the mixture was further stirred for two hours so as to continue the reaction.

The mixture was then neutralized by adding dropwise a 25% sodium hydroxide solution so as to adjust the pH to approximately 7.0. Then 12.0 parts of sodium chloride was added, and the mixture was stirred at 60° C. for 30 minutes. The mixture was cooled down to room temperature, and the deposited precipitate was collected by filtration, to thereby obtain a crude compound (intermediate) represented by chemical formula (c1) (yield: 89%). The compound (intermediate) represented by chemical formula (c1) was analyzed to have a purity measured by HPLC (at 254 nm) of 99.7%, an m/z of 306.0 ([M-Na]⁻), and a pure content of 76.8% (including salt).

(c1)

Into 250 parts of water, dissolved were 13.0 parts of the crude compound (intermediate) represented by chemical formula (c1), and 1.96 parts of sodium hydrogen carbonate, to which 2.42 parts of triphosgene was further added, and the mixture was stirred at a solution temperature of 30° C. for four hours. To the solution, 1.96 parts of sodium hydrogen carbonate was further added, and the mixture was stirred for two hours, so as to allow the reaction to proceed. Then 250 parts of water was added to dissolute the intermediate, the insoluble matter was removed by filtration, 10.0 parts of sodium chloride was added to the filtrate for salting-out, the precipitate was dissolved into N,N-dimethylformamide to remove the salt content, and the solvent was then evaporated under reduced pressure. In this way, 9.7 parts of a sodium salt of the compound in the free acid form, represented by chemical formula (I) (referred to as "compound 1-1"), was obtained (yield: 93%).

(I)

(Compounds 1-2 and 1-3)

A potassium salt of the compound represented by chemical formula (I) above (referred to as "compound 1-2") was obtained in the similar way, except that the compound used for salting-out in the synthetic flow of compound 1-1 was changed. In the similar way, an ammonium salt of the compound represented by chemical formula (I) above (referred to as "compound 1-3") was obtained.

(Compounds 2-1A)

To a solution prepared by dissolving 10.0 parts of 2-methoxyaniline (see chemical formula (b) above) in 15.8 part of methanol, added was 23.7 parts of concentrated hydrochloric acid, and the mixture was cooled in an ice bath. To the solution, a solution prepared by dissolving 5.8 parts of sodium nitrite in 10.0 parts of water was added dropwise at a solution temperature of 0 to 5° C., and the mixture was stirred for 30 minutes at this temperature. Next, 1.1 parts of amidosulfuric acid was added to obtain solution 1. Apart from this, 32.6 parts of the above-obtained crude compound represented by chemical formula (c1) (intermediate) and 31.6 parts of sodium carbonate were dissolved into 300 parts of water, the mixture was cooled in an ice bath, so as to keep the solution temperature at 0 to 5° C. The solution was then added dropwise to the above-prepared solution 1, while keeping the temperature unchanged. After completion of the dropwise addition, the solution was stirred overnight to continue the reaction. The mixture was then neutralized by adding dropwise concentrated hydrochloric acid, so as to adjust pH to approximately 7.0. Next, 56.0 parts of sodium chloride was added for salting-out, the precipitate was dissolved into N,N-dimethylformamide to remove the salt content, and the solvent was then evaporated under reduced pressure. In this way, a sodium salt of the compound II-1, represented by chemical formula (II-1) above (referred to as "compound 2-1A"), was obtained (yield: 67%).

(Compounds 2-1B and 2-1C)

A potassium salt of compound II-1 represented by chemical formula (II-1) above (referred to as "compound 2-1B") was obtained in the similar way as in the synthesis of compound 2-1A, except that the compound used for salting-out in the synthetic flow of compound 2-1A was changed. In the similar way, an ammonium salt of compound II-1 represented by chemical formula (II-1) above (referred to as "compound 2-1C") was obtained.

(Compounds 2-2 to 2-5)

Sodium salts of compounds 11-2 to 11-5 represented by chemical formulae (II-2) to (II-5) above were obtained in the similar way as in the synthesis of compound 2-1A, except that the starting material used in the synthetic flow of compound 2-1A was changed. The products are referred to as "compound 2-2", "compound 2-3", "compound 2-4" and "compound 2-5", respectively. That is, in the syntheses of compounds 2-2 to 2-5, compounds represented by chemical formulae (a2) to (a5) were respectively used, in place of the compound represented by the aforementioned chemical formula (a1) used for synthesizing compound 2-1A.

(a2)

(a3)

(a4)

(a5)

(Comparative Compound 1)

Comparative compound 1 represented by chemical formula (3-1) was synthesized according to procedures similar as those described in "Exemplary Synthesis 2" of Japanese Patent Application Laid-Open No. 2004-83903, except that 1,2-dibromoethane was used in place of 1,3-dibromopropane used in the exemplary synthesis. "t-Bu" in the chemical formula represents tert-butyl group.

(3-1)

(Comparative Compound 2)

Comparative compound 2 represented by chemical formula (3-2) was synthesized according to exemplary synthesis of "DYE-11" described in Japanese Patent Application Laid-Open No. 2007-63520. "t-Bu" in the chemical formula represents tert-butyl group.

(3-2)

<Preparation of Ink>

The respective components (unit: %) shown in the upper part of Table 2 were mixed, sufficiently stirred and then filtered under pressure with a filter having a pore size of 0.20 μm to prepare each ink. "Acetylenol E100" in Table 2 is a trade name of a nonionic surfactant (from Kawaken Fine Chemicals Co., Ltd.). In the lower part in Table 2, summarized were ink properties including content of first coloring material in ink $C_1$ (%), content of second coloring material in ink $C_2$ (%), total content of them $(C_1+C_2)$ (%) and $C_2/(C_1+C_2)\times100$(%).

TABLE 2

Compositions and Properties of Ink

| | Example 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|
| Compound 1-1 | 4.960 | | | 4.960 | 4.960 | 4.960 | 4.960 | 4.960 | 4.960 | 4.990 | 4.975 | 4.950 | 4.900 | 2.480 | 2.976 | 5.952 | 6.448 |
| Compound 1-2 | | 4.960 | | | | | | | | | | | | | | | |
| Compound 1-3 | | | 4.960 | | | | | | | | | | | | | | |
| Compound 2-1A | 0.040 | 0.040 | 0.040 | | | | | | | | | | | | | | |
| Compound 2-1B | | | | 0.040 | | | | | | | | | | | | | |
| Compound 2-1C | | | | | 0.040 | | | | | | | | | | | | |
| Compound 2-2 | | | | | | 0.040 | | | | | | | | | | | |
| Compound 2-3 | | | | | | | 0.040 | | | | | | | | | | |
| Compound 2-4 | | | | | | | | 0.040 | | | | | | | | | |
| Compound 2-5 | | | | | | | | | 0.040 | | | | | | | | |
| Comparative compound 1 | | | | | | | | | | 0.010 | 0.025 | 0.050 | 0.100 | 0.020 | 0.024 | 0.048 | 0.052 |
| Comparative compound 2 | | | | | | | | | | | | | | | | | |
| Ethylene glycol | 9.00 | 9.00 | 9.00 | 9.00 | 9.00 | 9.00 | 9.00 | 9.00 | 9.00 | 9.00 | 9.00 | 9.00 | 9.00 | 9.00 | 9.00 | 9.00 | 9.00 |
| Diethylene glycol | 9.00 | 9.00 | 9.00 | 9.00 | 9.00 | 9.00 | 9.00 | 9.00 | 9.00 | 9.00 | 9.00 | 9.00 | 9.00 | 9.00 | 9.00 | 9.00 | 9.00 |
| Acetylenol E100 | 1.00 | 1.00 | 1.00 | 1.00 | 1.00 | 1.00 | 1.00 | 1.00 | 1.00 | 1.00 | 1.00 | 1.00 | 1.00 | 1.00 | 1.00 | 1.00 | 1.00 |
| Pure water | 76.00 | 76.00 | 76.00 | 76.00 | 76.00 | 76.00 | 76.00 | 76.00 | 76.00 | 76.00 | 76.00 | 76.00 | 76.00 | 78.50 | 78.00 | 75.00 | 74.50 |
| Content of first coloring material C₁(%) | 4.960 | 4.960 | 4.960 | 4.960 | 4.960 | 4.960 | 4.960 | 4.960 | 4.960 | 4.990 | 4.975 | 4.950 | 4.900 | 2.480 | 2.976 | 5.952 | 6.448 |
| Content of second coloring material C₂(%) | 0.040 | 0.040 | 0.040 | 0.040 | 0.040 | 0.040 | 0.040 | 0.040 | 0.040 | 0.010 | 0.025 | 0.050 | 0.100 | 0.020 | 0.024 | 0.048 | 0.052 |
| C₁ + C₂(%) | 5.000 | 5.000 | 5.000 | 5.000 | 5.000 | 5.000 | 5.000 | 5.000 | 5.000 | 5.000 | 5.000 | 5.000 | 5.000 | 2.500 | 3.000 | 6.000 | 6.500 |
| C₂/(C₁ + C₂) × 100(%) | 0.80 | 0.80 | 0.80 | 0.80 | 0.80 | 0.80 | 0.80 | 0.80 | 0.80 | 0.20 | 0.50 | 1.00 | 2.00 | 0.80 | 0.80 | 0.80 | 0.80 |

TABLE 2-continued

Compositions and Properties of Ink

| | | Comparative Example | | | | | |
|---|---|---|---|---|---|---|---|
| | | 1 | 2 | 3 | 4 | 5 | 6 |
| Compound 1-1 | | | | | | | |
| Compound 1-2 | | | | | | | |
| Compound 1-3 | | | | | | | |
| Compound 2-1A | | 5.000 | | | | | |
| Compound 2-1B | | | | | | | |
| Compound 2-1C | | | | | | | |
| Compound 2-2 | | | | | | | |
| Compound 2-3 | | | | | | | |
| Compound 2-4 | | | 5.000 | | | 4.960 | 4.960 |
| Compound 2-5 | | | | | | | |
| Comparative compound 1 | | | | 5.000 | | | |
| Comparative compound 2 | | | | | 5.000 | 0.040 | 0.040 |
| Ethylene glycol | | 9.00 | 9.00 | 9.00 | 9.00 | 9.00 | 9.00 |
| Diethylene glycol | | 9.00 | 9.00 | 9.00 | 9.00 | 9.00 | 9.00 |
| Acetylenol E100 | | 1.00 | 1.00 | 1.00 | 1.00 | 1.00 | 1.00 |
| Pure water | | 76.00 | 76.00 | 76.00 | 76.00 | 76.00 | 76.00 |
| Content of first coloring material $C_1(\%)$ | | 0.000 | 5.000 | 0.000 | 0.000 | 4.960 | 4.960 |
| Content of second coloring material $C_2(\%)$ | | 5.000 | 0.000 | 0.000 | 0.000 | 0.000 | 0.000 |
| $C_1 + C_2(\%)$ | | 5.000 | 5.000 | 0.000 | 0.000 | 4.960 | 4.960 |
| $C_2/(C_1 + C_2) \times 100(\%)$ | | 100.00 | 0.00 | — | — | 0.00 | 0.00 |

<Evaluation>

Each of the thus prepared inks was filled in an ink cartridge and the ink cartridge was mounted on an ink jet recording apparatus (trade name "PIXUS iP8600", manufactured by Canon Inc.) in which an ink is ejected from a recording head by the action of thermal energy. In this example, a solid image recorded by applying 2.6 ng of 8 ink droplets to a unit region of 1/2400 inch×1/1200 inch is defined as "recording duty of 100%". In the evaluation criteria for the individual items below, "A" and "B" were defined to represent acceptable levels in the present invention, and "C" was defined to represent an unacceptable level. Results of evaluation are summarized in Table 3.

(Color Developability)

Using the aforementioned ink jet recording apparatus, images were recorded on a recording medium (trade name: "Canon Photo Paper, Gloss Professional [Platinum Grade] PT-201", manufactured by Canon Inc.), while varying the recording duty from 0% to 100% at 10% intervals. The obtained recorded matter was dried in an environment conditioned at 23° C. and 55% relative humidity for 24 hours. A part of image on the recorded matter, with a recording duty of 100%, was measured by using a spectrophotometer (trade name "Spectrolino", from GretagMacbeth GmbH) to find the optical density, and on the basis of which the color developability of the image was evaluated according to the criteria below:

A: optical density was 2.2 or more;
B: optical density was 2.0 or more to less than 2.2; and
C: optical density was less than 2.0.

(Hue)

Using the aforementioned ink jet recording apparatus, images were recorded on a recording medium (trade name: "Canon Photo Paper, Gloss Professional [Platinum Grade] PT-201", manufactured by Canon Inc.), while varying the recording duty from 0% to 100% at 10% intervals. The obtained recorded matter was dried in an environment conditioned at 23° C. and 55% relative humidity for 24 hours. A part of image on the recorded matter, with a recording duty of 100%, was measured to find a* and b* in the L*a*b* color system specified by Commission Internationale de l'Éclairage (CIE). Values of a* and b* were determined by using a spectrophotometer (trade name "Spectrolino", from GretagMacbeth GmbH), with a light source "D50" at a viewing angle of 2°. Using the thus obtained values of a* and b*, hue angle (H°) were individually calculated by using equations (A) below.

$$H°=\tan^{-1}(b*/a*), \text{ where } a*\geq 0 \text{ and } b*\geq 0 \text{ (first quadrant)}$$

$$H°=180+\tan^{-1}(b*/a*), \text{ where } a*\leq 0 \text{ and } b*\geq 0 \text{ (second quadrant)}$$

$$H°=180+\tan^{-1}(b*/a*), \text{ where } a*\leq 0 \text{ and } b*\leq 0 \text{ (third quadrant)}$$

$$H°=360+\tan^{-1}(b*/a*), \text{ where } a*\geq 0 \text{ and } b*\leq 0 \text{ (fourth quadrant)} \quad \text{Equations (A)}$$

On the basis of the thus obtained H° values, the hue of the image was evaluated according to the evaluation criteria below:

A: H° was 88° or more to 90° or less;
B: H° was 85° or more to less than 88°, or more than 90° to 92° or less; and
C: H° was less than 85°, or more than 92°.

(Light Fastness)

Using the aforementioned ink jet recording apparatus, images were recorded on a recording medium (trade name: "Canon Photo Paper, Gloss Professional [Platinum Grade] PT-201", manufactured by Canon Inc.), with a recording duty of 25%. The obtained recorded matter was dried in an environment conditioned at 23° C. and 55% relative humidity for 24 hours. Optical density of the solid image on the recorded matter was determined (optical density before light fastness test). The recorded matter was placed on a super xenon weather meter (model "SX-75", from Suga Test Instruments Co., Ltd.), and irradiated with xenon light at a chamber temperature of 24° C., a relative humidity of 60%, an irradiation intensity of 100 klx for 100 hours. Optical density of the solid image on the recorded matter was determined (optical density after light fastness test). From the thus obtained values of the optical density before and after the light fastness test, residual ratio of optical density was calculated by (optical density after light fastness test/optical density before light fastness test)×100(%), and the light fastness of the image was evaluated according to the evaluation criteria below:

A: residual ratio of optical density was 80% or more;
B: residual ratio of optical density was 70% or more to less than 80%; and
C: residual ratio of optical density was less than 70%.

TABLE 3

| | | Results of Evaluation | | |
| --- | --- | --- | --- | --- |
| | | Color developability | Hue | Light fastness |
| Examples | 1 | A | A | A |
| | 2 | A | A | A |
| | 3 | A | A | A |
| | 4 | A | A | A |
| | 5 | A | A | A |
| | 6 | A | A | B |
| | 7 | A | A | B |
| | 8 | A | A | B |
| | 9 | A | A | B |
| | 10 | A | B | A |
| | 11 | A | A | A |
| | 12 | A | A | A |
| | 13 | B | A | B |
| | 14 | B | A | B |
| | 15 | A | A | A |
| | 16 | A | A | A |
| | 17 | B | A | A |
| Comparative Examples | 1 | B | A | C |
| | 2 | C | C | A |
| | 3 | C | C | A |
| | 4 | C | C | A |
| | 5 | B | C | A |
| | 6 | B | C | A |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-204529, filed Nov. 12, 2019, and Japanese Patent Application No. 2020-168317, filed Oct. 5, 2020, which are hereby incorporated by reference herein in their entirety.

What is claimed is:

1. An aqueous ink for ink jet comprising a first coloring material and a second coloring material,
wherein the first coloring material is a compound represented by general formula (1), and
the second coloring material is a compound represented by general formula (2):

(1)

in general formula (1), M's each independently represent a hydrogen atom, alkali metal, ammonium or organic ammonium, (2)

in general formula (2), $R_1$ and $R_2$ each independently represent a hydrogen atom, —COOM or —SO$_3$M, and M's each independently represent a hydrogen atom, alkali metal, ammonium or organic ammonium.

2. The aqueous ink according to claim 1, wherein a proportion (% by mass) of a content of the second coloring material to a total content of the first coloring material and the second coloring material in the aqueous ink is 0.20% by mass or more to 2.00% by mass or less.

3. The aqueous ink according to claim 1, wherein a proportion (% by mass) of a content of the second coloring material to a total content of the first coloring material and the second coloring material in the aqueous ink is 0.50% by mass or more to 1.00% by mass or less.

4. The aqueous ink according to claim 1, wherein a total content (% by mass) of the first coloring material and the second coloring material in the aqueous ink is 2.500% by mass or more to 6.500% by mass or less, based on the total mass of the ink.

5. The aqueous ink according to claim 1, wherein a total content (% by mass) of the first coloring material and the second coloring material in the aqueous ink is 3.000% by mass or more to 6.000% by mass or less based on the total mass of the ink.

6. The aqueous ink according to claim 1, wherein the second coloring material is a compound represented by general formula (2.1):

(2.1)

in general formula (2.1), M represents a hydrogen atom, alkali metal, ammonium or organic ammonium.

7. An ink cartridge comprising an ink and an ink storage portion that stores the ink,
wherein the ink is the aqueous ink recited in claim 1.

8. An ink jet recording method comprising ejecting an ink from an ink jet recording head to record an image on a recording medium,
wherein the ink is the aqueous ink recited in claim 1.

9. The aqueous ink according to claim 1, wherein a content (% by mass) of the first coloring material in the aqueous ink is 0.100% by mass or more to 10.000% by mass or less based on the total mass of the ink.

10. The aqueous ink according to claim 1, wherein a content (% by mass) of the first coloring material in the aqueous ink is 0.500% by mass or more to 6.500% by mass or less based on the total mass of the ink.

11. The aqueous ink according to claim 1, wherein a content (% by mass) of the second coloring material in the aqueous ink is 0.010% by mass or more to 5.000% by mass or less based on the total mass of the ink.

12. The aqueous ink according to claim 1, wherein a content (% by mass) of the second coloring material in the aqueous ink is 0.010% by mass or more to 1.000% by mass or less based on the total mass of the ink.

13. The aqueous ink according to claim 1, wherein a proportion of a total content (% by mass) of the first coloring material and the second coloring material to a total content of all coloring materials in the aqueous ink is 10.0% by mass or more.

14. The aqueous ink according to claim 1, wherein a proportion of a total content (% by mass) of the first coloring material and the second coloring material to a total content of all coloring materials in the aqueous ink is 20.0% by mass or more.

15. The aqueous ink according to claim 1, wherein a proportion of a total content (% by mass) of the first coloring material and the second coloring material to a total content of all coloring materials in the aqueous ink is 100.0% by mass or less.

* * * * *